(12) United States Patent
Germain et al.

(10) Patent No.: US 7,886,682 B1
(45) Date of Patent: Feb. 15, 2011

(54) MULTIFUNCTIONAL EMERGENCY KIT AND ASSOCIATED METHOD

(76) Inventors: Twyla D Germain, 1065 W. Lomita Blvd., Sp #388, Harbor City, CA (US) 90710; Rowena M. Smith, 1065 W. Lomita Blvd., Sp #388, Harbor City, CA (US) 90710

( * ) Notice: Subject to any disclaimer, the term of this patent is extended or adjusted under 35 U.S.C. 154(b) by 232 days.

(21) Appl. No.: 11/986,217

(22) Filed: Nov. 20, 2007

Related U.S. Application Data

(60) Provisional application No. 60/859,906, filed on Nov. 20, 2006.

(51) Int. Cl.
*B64B 1/50* (2006.01)

(52) U.S. Cl. ............ 116/210; 116/DIG. 8; 116/DIG. 9; 244/33

(58) Field of Classification Search ............... 116/200, 116/201, 202, 209, 210, DIG. 8, DIG. 9; 244/31, 33; 446/220, 221, 224; 40/212, 40/214
See application file for complete search history.

(56) References Cited

U.S. PATENT DOCUMENTS

| | | | | |
|---|---|---|---|---|
| 3,746,285 A | * | 7/1973 | Mango | 244/98 |
| 4,736,281 A | * | 4/1988 | Neumeier | 362/186 |
| 4,872,414 A | | 10/1989 | Asquith | |
| 4,901,664 A | * | 2/1990 | Labrecque | 116/210 |
| 5,005,513 A | * | 4/1991 | Van Patten et al. | 116/210 |
| 5,007,367 A | | 4/1991 | Matteucci | |
| 5,199,374 A | | 4/1993 | Blanchette | |
| 5,429,244 A | * | 7/1995 | McCreary | 206/573 |
| 5,582,127 A | * | 12/1996 | Willis et al. | 116/210 |
| 6,195,039 B1 | * | 2/2001 | Glass, Jr. | 342/357.09 |
| 6,359,568 B1 | * | 3/2002 | Johnson | 340/691.7 |
| 6,523,778 B2 | * | 2/2003 | Key et al. | 244/31 |
| 2005/0006523 A1 | * | 1/2005 | French et al. | 244/31 |

FOREIGN PATENT DOCUMENTS

GB 2229414 A * 9/1990

* cited by examiner

*Primary Examiner*—Amy Cohen Johnson

(57) ABSTRACT

A multifunctional emergency kit includes a portable canister with an open top end and a lid. A helium cartridge is anchored within the canister, and a mechanism is included for automatically initiating an inflation process of the balloon while the lid is initially disposed at a closed position such that the balloon articulates the lid to an open position when filled to a predetermined volume. The kit further includes a plurality of illuminable sticks that glow in the dark when agitated. Such illuminable sticks are removably disposed within the canister, and a plurality of brackets are abutted against the helium cartridge and are anchored to the interior wall of the canister such that the helium cartridge remains statically and fixedly attached to the canister after the balloon is inflated and displaced out of the canister.

14 Claims, 6 Drawing Sheets

MULTIFUNCTIONAL EMERGENCY KIT AND ASSOCIATED METHOD

CROSS REFERENCE TO RELATED APPLICATIONS

This application claims the benefit of U.S. Provisional Application No. 60/859,906, filed Nov. 20, 2006, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to emergency kits and, more particularly, to a multifunctional emergency kit for notifying bystanders of an emergency event during traveling.

2. Prior Art

Knowing that disaster or calamity can occur at anytime the public has installed a universal code in the United States. That code is the 911 system on the telephone. By simply remembering to call 911 in any emergency, properly trained help will be dispatched to the scene of the emergency. However, persons who are in automobiles, boats on the water, or on off-road camping trips, often encounter emergency situations. When this happens, and there is no two way radio communication available, there is no adequate way of attracting assistance.

People have built signal fires, waved flags or arms to attract attention to their plight. The problem is that these methods of attracting help require that the person involved in the emergency situation do something. Action required may be continual broadcasting of a "help needed" message or of attracting attention. The harsh truth is that persons involved in an emergency situation may not be physically able to devote the time and energy to attract emergency assistance.

U.S. Pat. No. 4,872,414 to Asquith discloses an emergency signal balloon apparatus having a helium canister, an emergency signal balloon, a predetermined length of tether line, a valve assembly and a two part canister housing within which all of the components can be carried. The balloon is constructed of ultra-light, high-strength material, such as Mylar, and most of it would have an iridescent color, such as hunter's orange, with the upper portion having large wedged shaped sections of a highly reflective silver material. The balloon would further have large black letters, "CALL 911" which is the universal distress telephone number. Each of the letters of the message is bordered with highly reflective material so that when light strikes the material at night the message is clearly reflected and is highly visible. Unfortunately, this prior art example does not include LED lights to attract the attention of oncoming motorists.

U.S. Pat. No. 5,007,367 to Matteucci discloses a helium balloon attached to, and in communication with a helium bottle and attached thereto four guide lines so that selected lines can be pulled as needed to guide the balloon through clearings in overhead foliage. When not in use the lines are wound on a spindle to be packed with the deflated balloon. The spindle carries an arrowhead to be extended from one end thereof and driven into the ground to anchor the guide lines. Unfortunately, this prior art example is not designed to attract attention to a disabled vehicle.

U.S. Pat. No. 5,199,374 to Blanchette discloses an emergency location marker system for capsized vessels housed in an emergency location marker canister or container secured by a bracket to an exposed or outside surface of the vessel. An inflatable aerial location marker is deflated and folded in the small space of the canister. The aerial location marker is formed to provide upon inflation a relatively large surface area flat configuration to blanket a sufficient area of the sea surface for high visibility. The high visibility sea surface area blanketing marker is formed with at least one flexible joint for responding flexibly to wave motion while adhering to the sea surface. The sea surface area marker may be in a flat circular configuration, for example six feet in diameter and formed with a high visibility color. Flexible joints along intersecting diameters permit flexing of the flat circular configuration marker in response to waves from all directions. A source of compressed air or gas such as a compressed air cylinder is also housed in the canister coupled to the inflatable marker bladder. A valve on the compressed air cylinder or cartridge is activated by water immersion to inflate the bladder. The canister is comprised of separable segments constructed with break seams for opening or exploding in response to inflation of the location marker for releasing the inflating bladder. The canister also incorporates a feed line for example on a rotating spool. One end of the line is secured to the vessel and the other end to the location marker. Unfortunately, this prior art example is not designed to attract attention to a disabled vehicle.

Accordingly, the present invention is disclosed in order to overcome the above noted shortcomings. The present invention is convenient and easy to use, lightweight yet durable in design, and designed for notifying bystanders of an emergency event during traveling. The multifunctional emergency kit is simple to use, inexpensive, and designed for many years of repeated use.

BRIEF SUMMARY OF THE INVENTION

In view of the foregoing background, it is therefore an object of the present invention to provide an apparatus for notifying bystanders of an emergency event during traveling. These and other objects, features, and advantages of the invention are provided by a multifunctional emergency kit.

A multifunctional emergency kit includes a portable canister with an open top end and a lid pivotally connected directly to the open top end for effectively shielding an interior of the canister from foreign debris and fluids during non-operating conditions. Such a lid includes a safety latch attached thereto and releasably mated with a perimeter of the open top end of the canister respectively.

The kit further includes a helium cartridge anchored within the canister. Such a helium cartridge has a control valve coupled thereto, and such a helium cartridge is conveniently maintained at a vertically upright position within the canister. A balloon has a spout directly coupled to the helium cartridge, and a flexible and elongated cord has opposed ends tethered to the balloon and to an interior surface of the canister respectively.

The kit further includes a mechanism for automatically initiating an inflation process of the balloon while the lid is initially disposed at a closed position such that the balloon articulates the lid to an open position when filled to a predetermined volume. Such an automatic inflation initiating process includes a user interface disposed along an exterior surface of the canister and protruding outwardly therefrom, a power source housed within the canister, a controller electrically coupled to the user interface and seated within the canister, and a sensor electrically coupled to the control valve and the controller respectively. Such a controller is electrically coupled to the control valve, and the controller generates and transmits an output signal to the control valve based upon receipt of an input signal from the user interface when the user depresses the user interface such that the helium cartridge releases air into the balloon. The sensor advantageously generates and transmits an air pressure level indication signal to the controller when an internal air pressure level of the balloon reaches a predetermined air pressure threshold level such that the controller automatically toggles the control valve to a closed position.

The kit further includes a plurality of illuminable sticks that glow in the dark when agitated. Such illuminable sticks are removably disposed within the canister, and a plurality of brackets are abutted against the helium cartridge and are anchored to the interior wall of the canister such that the helium cartridge remains statically and fixedly attached to the canister after the balloon is inflated and displaced out of the canister. The balloon is effectively detached from the helium cartridge and freely floats above the canister while tethered to the canister by the cord.

A method for notifying bystanders of an emergency event during travel includes the steps of: providing a portable canister with an open top end; pivotally connecting a lid directly to the open top end for shielding an interior of the canister from foreign debris and fluids during non-operating conditions; anchoring a helium cartridge within the canister by maintaining the helium cartridge at a vertically upright position within the canister, the helium cartridge having a control valve coupled thereto; directly coupling a spout of a balloon to the helium cartridge; tethering opposed ends of a flexible and elongated cord to the balloon and to an interior surface of the canister respectively; automatically initiating an inflation process of the balloon while the lid is initially disposed at a closed position such that the balloon articulates the lid to an open position when filled to a predetermined volume; and manually detaching the balloon spout from the helium cartridge to thereby allow the balloon to freely float above the canister while is tethered to the canister by the cord.

The method further includes the steps of: providing a user interface disposed along an exterior surface of the canister and protruding outwardly therefrom; providing a power source housed within the canister; providing a controller electrically coupled to the user interface and the control valve and further is seated within the canister; providing a sensor electrically coupled to the control valve and the controller respectively; the controller generating and transmitting an output signal to the control valve based upon receipt of an input signal from the user interface when the user depresses the user interface such that the helium cartridge releases air into the balloon; and the sensor generating and transmitting an air pressure level indication signal to the controller when an internal air pressure level of the balloon reaches a predetermined air pressure threshold level such that the controller automatically toggles the control valve to a closed position.

The method further includes the steps of: removably disposing a plurality of illuminable sticks within the canister, the illuminable sticks glowing in the dark when agitated; abutting a plurality of brackets against the helium cartridge by anchoring the brackets to the interior wall of the canister such that the helium cartridge remains statically and fixedly attached to the canister after the balloon is inflated and displaced out of the canister; and releasably attaching a safety latch to a perimeter of the open top end of the canister.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
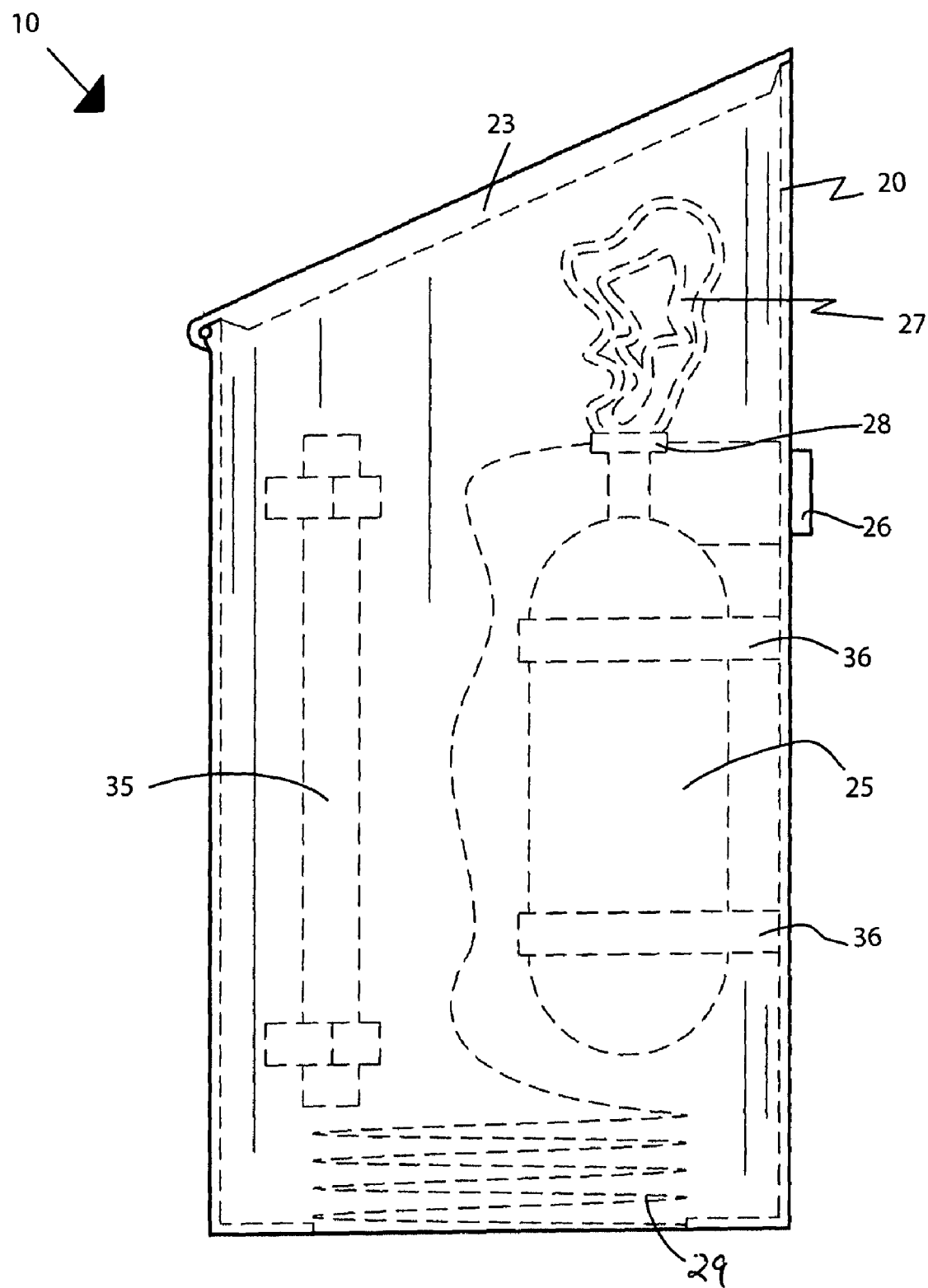
FIG. 1 is a side elevational view of a multifunctional emergency kit, in accordance with the present invention.
Figure 2:
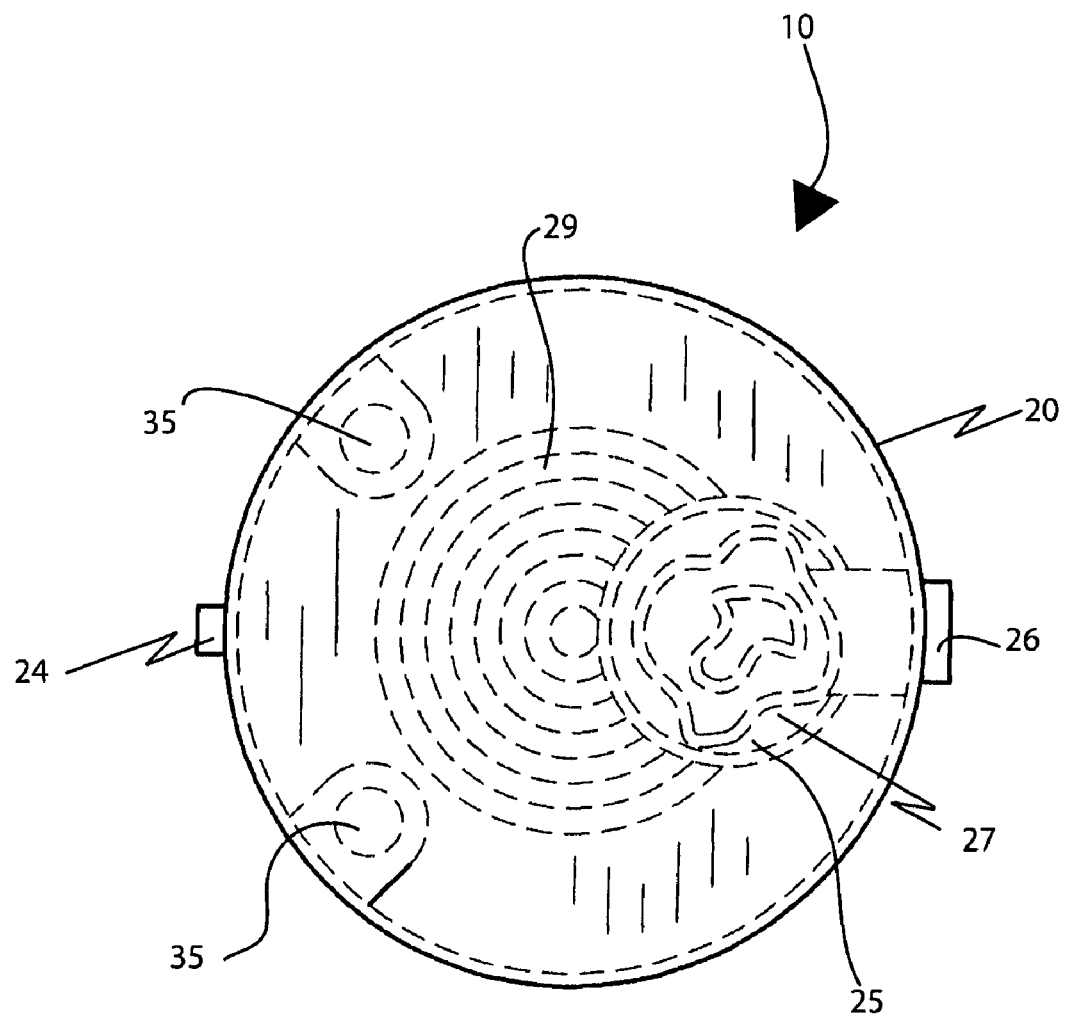
FIG. 2 is a top planar view of a multifunctional emergency kit, in accordance with the present invention.
Figure 3:
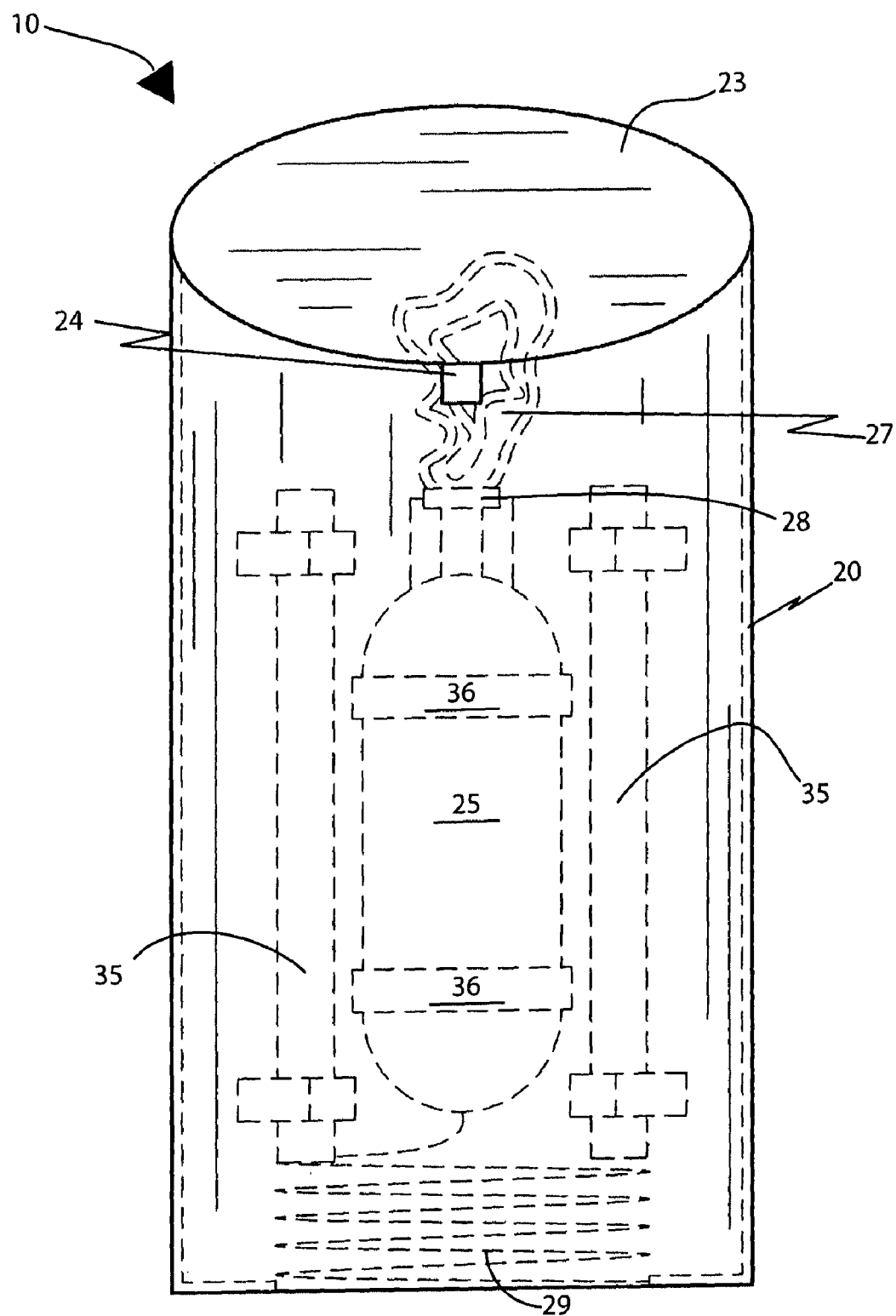
FIG. 3 is a rear elevational view of a multifunctional emergency kit, in accordance with the present invention.
Figure 4:
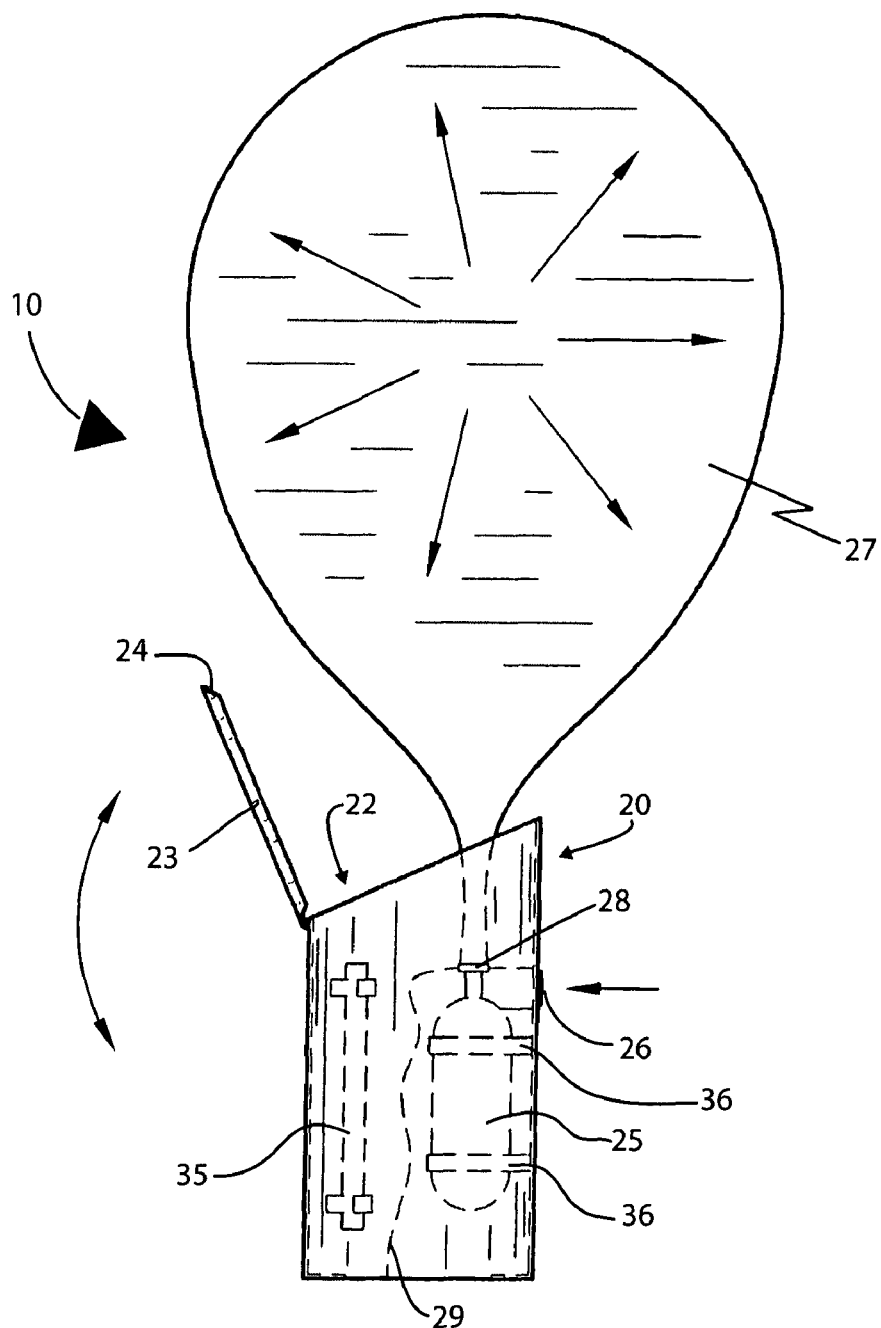
FIG. 4 is a side elevational view of a multifunctional emergency kit, with the balloon in an expanded position, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The kit of this invention is referred to generally in FIGS. 1-5 by the reference numeral 10 and is intended to protect a multifunctional emergency kit. It should be understood that the kit 10 may be used to protect many different types of emergency kits and should not be limited to only those emergency kits mentioned herein.

Referring initially to FIGS. 1, 2, 3 and 4, a multifunctional emergency kit 10 includes a portable canister 20 with an open top end 22 and a lid 23 pivotally connected directly, without the use of intervening elements, to the open top end 22 for shielding an interior of the canister 20 from foreign debris and fluids during non-operating conditions. Such a lid 23 includes a safety latch 24 attached thereto and releasably mated with a perimeter of the open top end 22 of the canister 20 respectively. The canister 20 is provided for housing the contents of the kit 10.

Referring to FIGS. 1, 2, 3, 4 and 5, the kit 10 further includes a helium cartridge 25 anchored within the canister 20. Such a helium cartridge 25 has a control valve 26 coupled thereto, and such a helium cartridge 25 is maintained at a vertically upright position within the canister 20. A balloon 27 has a spout 28 directly coupled, without the use of intervening elements, to the helium cartridge 25, and a flexible and elongated cord 29 has opposed ends tethered to the balloon 27 and to an interior surface of the canister 20 respectively. The helium cartridge 25 is provided for automatically inflating the balloon 27.

Figure 5:
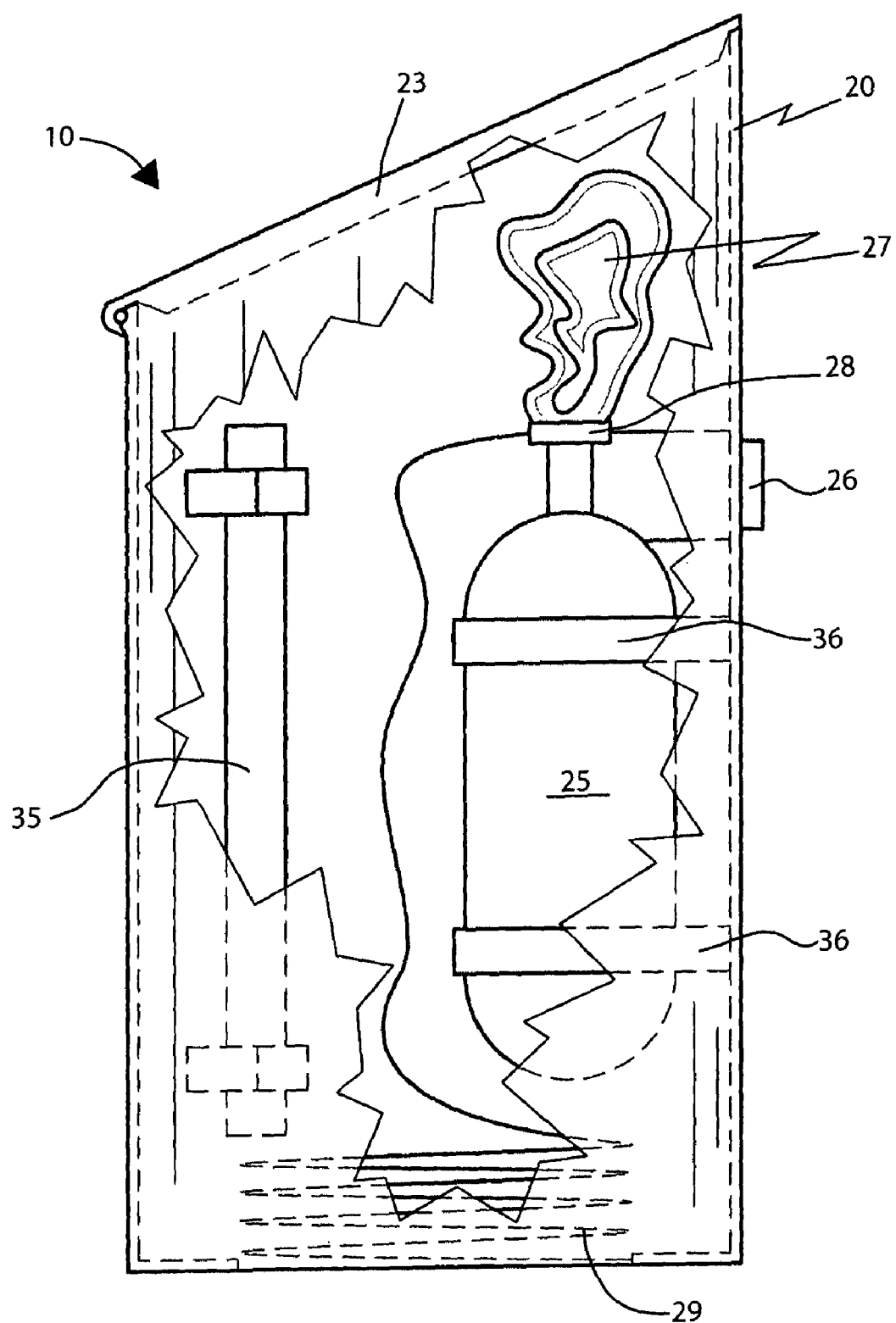
FIG. 5 is a partially exposed side elevational view of the present invention showing the balloon at a deflated position.
Figure 6:
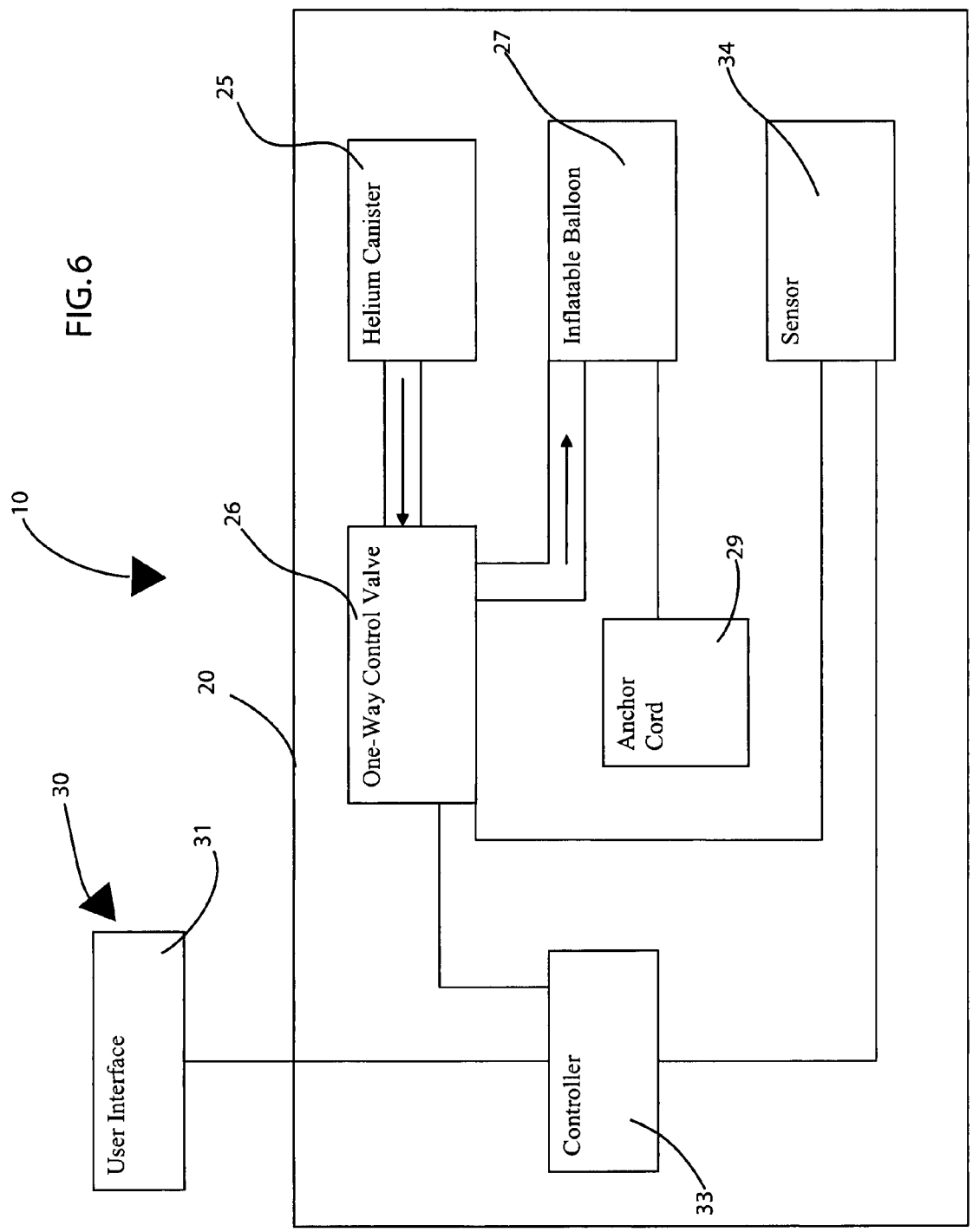
FIG. 6 is a schematic block diagram of a multifunctional emergency kit, in accordance with the present invention.

Referring to FIG. 5, the kit 10 further includes a mechanism 30 for automatically initiating an inflation process of the balloon 27 while the lid 23 is initially disposed at a closed position which is essential such that the balloon 27 articulates the lid 23 to an open position when filled to a predetermined volume. Such an automatic inflation initiating process mechanism 30 includes a user interface 31 disposed along an exterior surface of the canister 20 and protruding outwardly therefrom, a power source housed within the canister 20, a controller 33 electrically coupled to the user interface 31 and seated within the canister 20, and a sensor 34 electrically coupled to the control valve 26 and the controller 33 respectively. Such a controller 33 is electrically coupled to the control valve 26, and the controller 33 generates and transmits an output signal to the control valve 33 based upon receipt of an input signal from the user interface 31 when the user depresses the user interface which is vital such that the helium cartridge 25 releases air into the balloon 27. The sensor 34 generates and transmits an air pressure level indication signal to the controller 33 when an internal air pressure level of the balloon 27 reaches a predetermined air pressure threshold level which is important such that the controller 33 automatically toggles the control valve 26 to a closed position. The controller 33 is provided for ensuring that the balloon 27 does not become over inflated.

Referring to FIGS. 1, 2, 3 and 4, the kit 10 further includes a plurality of illuminable sticks 35 that glow in the dark when agitated. Such illuminable sticks 35 are removably disposed within the canister 20, and a plurality of brackets 36 are abutted against the helium cartridge 26 and are anchored to the interior wall of the canister 20 such that the helium cartridge 25 remains statically and fixedly attached to the canister 20 after the balloon 27 is inflated and displaced out of the canister 20. The balloon 27 is detached from the helium cartridge 26 and freely floats above the canister 20 while tethered to the canister 20 by the cord 29. The illuminable sticks 35 are used for attracting the attention of passing motorists.

In use, the inflatable balloon distress signal kit is simple and straightforward to operate. Before leaving the home, the user places the kit in an easily accessible area. Should the user encounter car trouble or get lost, the kit is removed from its storage space and the case is opened. After twisting the helium canister's valve to release air, the user depresses the inflator button to deploy the distress balloon. When this action occurs, helium fills the attached balloon, and the pressure of the air releases the inflated balloon from the helium cartridge and into the air. The end of the para-cord that is tethered to the mouth of the balloon effectively constricts the opening to capture the air inside, while the opposite end remains attached within the case. As the balloon floats above, the user can calmly wait for rescue. If necessary, the user can break one or both of the glow sticks in half to create a neon beacon to attract attention of any approaching motorists. After the user has been rescued and safely assisted, the kit is easily reassembled and ready for use when needed again.

The kit includes an outer case made of a durable, waterproof plastic material for housing the components thereof. Such a case measures approximately eleven inches in height and seven inches in width. The case has a flap-like opening with a snap-fastener on the front edge thereof. A heavy gauge inflatable balloon is coiled within the case. Such a balloon is covered with a bright orange-colored material that is specifically configured to be visible to the eye. A flashing light emitting diode (LED) is incorporated into the balloon's design to advantageously further facilitate visibility. When inflated, the balloon has a circumference of approximately eighteen inches.

The mouth of the balloon is directly attached, without the use of intervening elements, to a cylindrically shaped helium cartridge, which measures approximately four inches in length and about one inch in width. A length of nylon paracord is directly tethered, without the use of intervening elements, to the mouth of the balloon and is coiled within a pouch. The cord is capable of stretching the length of approximately one hundred feet and is reinforced within the pouch at its opposite end. The helium cartridge is activated via an adjustable air valve and thumb-operated button mechanism, which extends horizontally through a small opening in the top of the cartridge. In addition, an internal battery source is included to power the kit's LED capabilities. A pair of neon glow sticks is included for offering an effective means of alerting people on the ground.

The present invention, as claimed, provides the unexpected and unpredictable benefit of a kit that is convenient and easy to use, is lightweight and portable in nature, and provides individuals with an easy, effective means of calling for help should they become lost or in need of assistance. The distress signal is compactly packaged within a durable case, facilitates an expedient rescue, and allows individuals to avoid the risk of extended exposure to the elements or other dangers. With an easy jerk of the case's snap-on opening and a quick push of the deployment button, the present invention sends out a distress signal in a matter of seconds. With a bright, neon balloon floating in mid-air, the distress signal can easily be seen by any passing aircraft. Moreover, the balloon's LED lights and radar deflecting capabilities allows rescue vessels to hone in on an accident victim, eliminating hours of fruitless searching in vast, dark landscapes.

In use, a method for notifying bystanders of an emergency event during travel includes the steps of: providing a portable canister 20 with an open top end 22; pivotally connecting a lid 23 directly, without the use of intervening elements, to the open top end 22 for shielding an interior of the canister 20 from foreign debris and fluids during non-operating conditions; anchoring a helium cartridge 25 within the canister 20 by maintaining the helium cartridge 25 at a vertically upright position within the canister 20, the helium cartridge 25 having a control valve 26 coupled thereto; directly coupling, without the use of intervening elements, a spout 28 of a balloon 27 to the helium cartridge 25; tethering opposed ends of a flexible and elongated cord 29 to the balloon 27 and to an interior surface of the canister 20 respectively; automatically initiating an inflation process of the balloon 27 while the lid 23 is initially disposed at a closed position such that the balloon 27 articulates the lid 23 to an open position when filled to a predetermined volume; and manually detaching the balloon spout 28 from the helium cartridge 25 to thereby allow the balloon 27 to freely float above the canister 20 while being tethered to the canister 20 by the cord 29.

In use, the method further includes the steps of: providing a user interface 31 disposed along an exterior surface of the canister 20 and protruding outwardly therefrom; providing a power source housed within the canister 20; providing a controller 33 electrically coupled to the user interface 31 and the control valve 26 and further being seated within the canister 20; providing a sensor 34 electrically coupled to the control valve 26 and the controller 33 respectively; the controller generating and transmitting an output signal to the control valve 26 based upon receipt of an input signal from the user interface 31 when the user depresses the user interface 31 such that the helium cartridge 25 releases air into the balloon 27; and the sensor 34 generating and transmitting an air pressure level indication signal to the controller 33 when an internal air pressure level of the balloon 27 reaches a predetermined air pressure threshold level such that the controller 33 automatically toggles the control valve 26 to a closed position.

In use, the method further includes the steps of: removably disposing a plurality of illuminable sticks 35 within the canister 20, the illuminable sticks 35 glowing in the dark when agitated; abutting a plurality of brackets 36 against the helium cartridge 25 by anchoring the brackets 36 to the interior wall of the canister 20 such that the helium cartridge 25 remains statically and fixedly attached to the canister 20 after the balloon 27 is inflated and displaced out of the canister 20; and releasably attaching a safety latch 24 to a perimeter of the open top end 22 of the canister 20.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A multifunctional emergency kit for notifying bystanders of an emergency event during travel, said multifunctional emergency kit comprising:
a portable canister having an open top end;
a lid pivotally connected directly to said open top end for shielding an interior of said canister from foreign debris and fluids during non-operating conditions;
a helium cartridge anchored within said canister, said helium cartridge having a control valve coupled thereto;
a balloon directly coupled to said helium cartridge;
a flexible and elongated cord having opposed ends tethered to said balloon and to an interior surface of said canister respectively;
means for automatically initiating an inflation process of said balloon while said lid is initially disposed at a closed position such that said balloon articulates said lid to an open position when filled to a predetermined volume;
wherein said canister has a single continuous cavity formed therein, said single continuous cavity extending from said lid to a bottom most surface of said canister, said helium cartridge and said balloon and said cord and said automatic inflation initiating process means are situated within said single continuous cavity;
wherein said automatic inflation initiating process means comprises:
a user interface disposed along an exterior surface of said canister and protruding outwardly therefrom;
a controller electrically coupled to said user interface and being seated within said canister; and
a sensor electrically coupled to said control valve and said controller respectively;
wherein said controller is electrically coupled to said control valve, said controller generating and transmitting an output signal to said control valve based upon receipt of an input signal from said user interface when the user depresses said user interface such that said helium cartridge releases air into said balloon;
wherein said sensor generates and transmits an air pressure level indication signal to said controller when an internal air pressure level of said balloon reaches a predetermined air pressure threshold level such that said controller automatically toggles said control valve to a closed position.

2. The multifunctional emergency kit of claim 1, further comprising:
a plurality of illuminable sticks that glow in the dark when agitated, said illuminable sticks being removably disposed within said canister.

3. The multifunctional emergency kit of claim 1, further comprising:
a plurality of brackets abutted against said helium cartridge and being anchored to the interior wall of said canister such that said helium cartridge remains statically and fixedly attached to said canister after said balloon is inflated and displaced out of said canister.

4. The multifunctional emergency kit of claim 1, wherein said lid comprises: a safety latch attached thereto and releasably mated with a perimeter of said open top end of said canister respectively.

5. The multifunctional emergency kit of claim 1, wherein said balloon is detached from said helium cartridge and freely floats above said canister while being tethered to said canister by said cord.

6. A multifunctional emergency kit for notifying bystanders of an emergency event during travel, said multifunctional emergency kit comprising:
a portable canister having an open top end;
a lid pivotally connected directly to said open top end for shielding an interior of said canister from foreign debris and fluids during non-operating conditions;
a helium cartridge anchored within said canister, said helium cartridge having a control valve coupled thereto, said helium cartridge being maintained at a vertically upright position within said canister;
a balloon having a spout directly coupled to said helium cartridge;
a flexible and elongated cord having opposed ends tethered to said balloon and to an interior surface of said canister respectively;
means for automatically initiating an inflation process of said balloon while said lid is initially disposed at a closed position such that said balloon articulates said lid to an open position when filled to a predetermined volume;
wherein said canister has a single continuous cavity formed therein, said single continuous cavity extending from said lid to a bottom most surface of said canister, said helium cartridge and said balloon and said cord and said automatic inflation initiating process means are situated within said single continuous cavity;

wherein said automatic inflation initiating process means comprises:
 a user interface disposed along an exterior surface of said canister and protruding outwardly therefrom;
 a controller electrically coupled to said user interface and being seated within said canister; and
 a sensor electrically coupled to said control valve and said controller respectively;
 wherein said controller is electrically coupled to said control valve, said controller generating and transmitting an output signal to said control valve based upon receipt of an input signal from said user interface when the user depresses said user interface such that said helium cartridge releases air into said balloon;
 wherein said sensor generates and transmits an air pressure level indication signal to said controller when an internal air pressure level of said balloon reaches a predetermined air pressure threshold level such that said controller automatically toggles said control valve to a closed position.

7. The multifunctional emergency kit of claim 6, further comprising:
 a plurality of illuminable sticks that glow in the dark when agitated, said illuminable sticks being removably disposed within said canister.

8. The multifunctional emergency kit of claim 6, further comprising:
 a plurality of brackets abutted against said helium cartridge and being anchored to the interior wall of said canister such that said helium cartridge remains statically and fixedly attached to said canister after said balloon is inflated and displaced out of said canister.

9. The multifunctional emergency kit of claim 6, wherein said lid comprises: a safety latch attached thereto and releasably mated with a perimeter of said open top end of said canister respectively.

10. The multifunctional emergency kit of claim 6, wherein said balloon is detached from said helium cartridge and freely floats above said canister while being tethered to said canister by said cord.

11. A method for notifying bystanders of an emergency event during travel, said method comprising the steps of:
 a. providing a portable canister having an open top end;
 b. pivotally connecting a lid directly to said open top end for shielding an interior of said canister from foreign debris and fluids during non-operating conditions;
 c. anchoring a helium cartridge within said canister by maintaining said helium cartridge at a vertically upright position within said canister, said helium cartridge having a control valve coupled thereto;
 d. directly coupling a spout of a balloon to said helium cartridge;
 e. tethering opposed ends of a flexible and elongated cord to said balloon and to an interior surface of said canister respectively;
 f. automatically initiating an inflation process of said balloon while said lid is initially disposed at a closed position such that said balloon articulates said lid to an open position when filled to a predetermined volume;
 g. manually detaching said balloon spout from said helium cartridge to thereby allow said balloon to freely float above said canister while being tethered to said canister by said cord;
 wherein said canister has a single continuous cavity formed therein, said single continuous cavity extending from said lid to a bottom most surface of said canister, said helium cartridge and said balloon and said cord and said automatic inflation initiating process means are situated within said single continuous cavity;
 wherein step f. comprises the steps of:
 providing a user interface disposed along an exterior surface of said canister and protruding outwardly therefrom;
 providing a controller electrically coupled to said user interface and said control valve and further being seated within said canister;
 providing a sensor electrically coupled to said control valve and said controller respectively;
 said controller generating and transmitting an output signal to said control valve based upon receipt of an input signal from said user interface when the user depresses said user interface such that said helium cartridge releases air into said balloon; and
 said sensor generating and transmitting an air pressure level indication signal to said controller when an internal air pressure level of said balloon reaches a predetermined air pressure threshold level such that said controller automatically toggles said control valve to a closed position.

12. The method of claim 11, further comprising the steps of:
 removably disposing a plurality of illuminable sticks within said canister, said illuminable sticks glowing in the dark when agitated.

13. The method of claim 11, wherein step c. comprises the steps of:
 abutting a plurality of brackets against said helium cartridge by anchoring said brackets to the interior wall of said canister such that said helium cartridge remains statically and fixedly attached to said canister after said balloon is inflated and displaced out of said canister.

14. The method of claim 11, wherein step b. comprises the steps of:
 releasably attaching a safety latch to a perimeter of said open top end of said canister.

* * * * *